(12) United States Patent
Pisek et al.

(10) Patent No.: US 7,769,912 B2
(45) Date of Patent: Aug. 3, 2010

(54) MULTISTANDARD SDR ARCHITECTURE USING CONTEXT-BASED OPERATION RECONFIGURABLE INSTRUCTION SET PROCESSORS

(75) Inventors: Eran Pisek, Plano, TX (US); Jasmin Oz, Plano, TX (US); Yan Wang, Plano, TX (US); Ronald J. Webb, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1461 days.

(21) Appl. No.: 11/142,504

(22) Filed: Jun. 1, 2005

(65) Prior Publication Data
US 2006/0211387 A1    Sep. 21, 2006

Related U.S. Application Data

(63) Continuation-in-part of application No. 11/123,313, filed on May 6, 2005, now Pat. No. 7,668,992.

(60) Provisional application No. 60/653,968, filed on Feb. 17, 2005, provisional application No. 60/654,034, filed on Feb. 17, 2005.

(51) Int. Cl.
*G06F 19/00*    (2006.01)
(52) U.S. Cl. .................... 710/8; 370/310; 712/17; 712/37
(58) Field of Classification Search .............. 326/39, 326/46; 375/130, 219, 242, 295; 455/550, 455/561; 712/15, 245
See application file for complete search history.

(56) References Cited

U.S. PATENT DOCUMENTS 6,937,877 B2 *   8/2005   Davenport ............... 455/552.1

(Continued)

OTHER PUBLICATIONS

Chow et al., Low Power Realization of Finite State Machines—A Decomposition Approach, 1996, ACM, vol. 1, No. 3, pp. 315-340.*
Mitchell et al., MPEG Video Compression Standard, 1996, Kluwer Academic Publishers, pp. 25-27.*
Agha et al., Algorithms and VLSI Architectures for MPEG-4 Motion Estimation, 2003, Loughborough University, pp. 24-27.*

*Primary Examiner*—Henry W. H. Tsai
*Assistant Examiner*—Cheng-Yuan Tseng (57) ABSTRACT

A software-defined radio (SDR) system comprising: 1) a reconfigurable baseband subsystem for supporting a plurality of wireless communication standards comprising a first plurality of reconfigurable context-based operation instruction set processors; and 2) a reconfigurable application subsystem for supporting a plurality of end-user applications comprising a second plurality of reconfigurable context-based operation instruction set processors.

Each of the first and second pluralities of reconfigurable context-based operation instruction set processors comprises: i) a reconfigurable data path comprising a plurality of reconfigurable functional blocks; and ii) a programmable finite state machine that controls the reconfigurable data path, wherein the programmable finite state machine is capable of executing a plurality of instructions associated with a particular function.

19 Claims, 7 Drawing Sheets

U.S. PATENT DOCUMENTS

| | | | |
|---|---|---|---|
| 7,043,023 B2 * | 5/2006 | Watanabe et al. | 380/270 |
| 7,193,435 B2 * | 3/2007 | Grabill et al. | 326/39 |
| 7,406,328 B2 * | 7/2008 | Wallace | 455/552.1 |
| 7,580,413 B2 * | 8/2009 | Li Po et al. | 370/395.4 |
| 2002/0031166 A1 * | 3/2002 | Subramanian et al. | 375/130 |
| 2003/0008684 A1 * | 1/2003 | Ferris | 455/561 |
| 2004/0063425 A1 * | 4/2004 | Wakutsu et al. | 455/418 |
| 2005/0041746 A1 * | 2/2005 | Rosen et al. | 375/242 |
| 2005/0097306 A1 * | 5/2005 | Gajski | 712/245 |
| 2005/0216700 A1 * | 9/2005 | Honary et al. | 712/15 |
| 2006/0211387 A1 * | 9/2006 | Pisek et al. | 455/130 |

* cited by examiner

FIG. 1
(PRIOR ART)

| EVENT | START | S1 | S2 | S3 | S4 | S5 | S6 | S7 | S8 | S9 | S10 |
|---|---|---|---|---|---|---|---|---|---|---|---|
| E1 | S1 | S9 | S4 | S2 | | | | | | | S8 |
| E2 | | S2 | | | | S4 | | | S10 | | |
| E3 | | S2 | | S5 | | | | | | | S8 |
| E4 | | S10 | S9 | | | | S9 | S9 | | | |
| E5 | | | | | S9 | S3 | | | | S10 | S7 |
| E6 | | | | S2 | S2 | | S5 | | | | |
| E7 | | | | S2 | | | S5 | S6 | | | STOP |

MULTISTANDARD SDR ARCHITECTURE USING CONTEXT-BASED OPERATION RECONFIGURABLE INSTRUCTION SET PROCESSORS

CROSS-REFERENCE TO RELATED APPLICATIONS AND CLAIM OF PRIORITY

The present invention is related to those disclosed in U.S. Prov. Pat. No. 60/653,968, filed Feb. 17, 2005, entitled "Context-Based Operation Reconfigurable Instruction Set Processor", and U.S. Prov. Pat. No. 60/654,034, filed Feb. 17, 2005, entitled "Method And Apparatus For Multistandard Software Defined Radio HW Architecture". Prov. Pat. Nos. 60/653,968 and 60/654,034 are assigned to the assignee of the present application and are incorporated by reference into the present disclosure. The present application claims priority under 35 U.S.C. §119(e) to U.S. Provisional Patent Nos. 60/653,968 and 60/654,034.

The present application is a continuation-in-part of U.S. patent application Ser. No. 11/123,313, filed on May 6, 2005 now U.S. Pat. No. 7,668,992, entitled "Context-based Operation Reconfigurable Instruction Set Processor and Method of Operation." Application Ser. No. 11/123,313 is assigned to the assignee of the present application and is incorporated by reference into the present application as if fully set forth herein. The present application claims priority under 35 U.S.C. §120 to U.S. patent application Ser. No. 11/123,313.

TECHNICAL FIELD OF THE INVENTION

The present invention relates generally to wireless communication devices and, more specifically, to software-defined radio (SDR) communication devices that use reconfigurable instruction set hardware.

BACKGROUND OF THE INVENTION

Data processors are used in nearly every type of modern electronic device, including consumer electronics, industrial machinery, scientific apparatuses and communication networks. However, the performance and degree of complexity of the data processors (or microprocessors) used in different applications may vary widely. The speed and power requirements of a particular application are important in determining the type of data processor used.

The type of data processor used is particularly important in software-defined radio (SDR) implementations. An SDR device uses reconfigurable hardware that may be programmed over the air to operate under different wireless protocols. For example, an SDR transceiver in a wireless laptop computer may be configured by a first software load to operate in an IEEE-802.11x wireless network and may be reconfigured by a second software load to operate in a CDMA2000 wireless network.

There are six main types of data processors in common use: 1) digital signal processors, 2) reduced instruction set computers, 3) complex instruction set computers, 4) field programmable gate arrays, 5) application specific integrated circuits, and 6) application specific instruction set processors. Each of these types of data processors has particular advantages and particular disadvantages.

A digital signal processor (DSP) is a general-purpose processor optimized to efficiently execute digital signal processing operations, such as a Multiply-Accumulate operation for finite impulse response (FIR) filtering and Fast Fourier Transform (FFT) operations. A DSP implements many sophisticated addressing modes to cover many of the DSP calculation requirements, such as bit reverse addressing mode for FFT, index addressing for FIFO devices, and the like. Examples of DSPs include: 1) the Motorola 56000, 56300, SC81xx, and MRC6011 processors; 2) the Texas Instruments (TI) C55, C6203, C6416, and C67xx processors; 3) the ADI Sharc and TigerSharc processors; and 4) the Morpho MS1-64 Reconfigurable DSP.

A reduced instruction set computer (RISC) is a general purpose processor (GPP) that mainly targets control applications, such as media access control (MAC) applications. The main advantage of the RISC machine is its simplicity. As its name, A RISC processor has small instruction set, which provides more code density as well as faster change-of-flow reaction. Examples of RISC devices include: 1) ARM processors (e.g., ARM926, ARM1136J); 2) MIPS processors (e.g., MIPS32, MIPS64); 3) the IBM PowerPC 405 and 750FX; and 4) the Motorola PowerPC 603.

A complex instruction set computer (CISC) device is a general purpose processor (GPP) targeted to the general purpose applications ranging from multimedia applications to PC applications. Examples of CISC processors include: 1) the Intel Pentium; and 2) the Motorola 68000.

The field programmable gate array (FPGA) is a reconfigurable hardware device based on an array of hardware cells connected through long busses and local busses. FPGA devices are quite commonly used in wireless network base station applications and prototypes. Examples of FPGA devices include: 1) the Xilinx Virtex IV; and 2) the Altera Stratix II.

An application specific integrated circuit (ASIC) is a hardware device specially designed for a specific application. An ASIC is usually very power efficient. ASIC devices are used in many wireless devices (i.e., cell phones, etc.). An application specific instruction set processor (ASIP) is an enhanced version of an ASIC device that adds more programmability to the ASIC hardware.

Each of the above-described processors has certain advantages and suffers from particular disadvantages. Digital signal processors are the most flexible type of processor, from a software point of view, in order to meet software-defined radio (SDR) requirements. However, DSP devices do not have enough MIPS performance and bit manipulation architecture to meet 3G and 4G bit-rate processing requirements. RISC processors target control applications, but are inadequate beyond baseband applications for wireless network implementations. CISC processors may have the flexibility and the MIPS performance to process baseband applications, but their poor power efficiency makes them unsuitable for handset power restrictions. FPGA devices, like CISC processors, may meet the required MIPS performance, but their poor power efficiency makes them unsuitable for handset designs.

ASIC devices are well matched to the power and cost restrictions of handset designs. However, their flexibility is too limited to make them suitable for SDR implementations. ASIP devices achieve greater flexibility than ASIC devices by adding more programmability to the application specific hardware and by introducing instruction-set processors to the hardware. However, since ASIPs are general-purpose devices, their processor core efficiency depends on the application being processed. The more control code in the application, the less efficient the ASIP will be. This results in poor performance and higher power consumption.

Additional disadvantages of the prior art processors are scalability and modularity. The software-defined radio (SDR) approach was created in order to minimize cost (design time, TTM) and power consumption and to maximize flexibility.

The prior art processor implementations fail to provide an optimized combination of scalability and modularity.

Therefore, there is a need in the art for an improved software-defined radio (SDR) architecture that minimizes cost and power consumption while maintaining flexibility. In particular, there is a need for an software-defined radio (SDR) wireless device that is implemented using low-power configurable processors.

SUMMARY OF THE INVENTION

To address the above-discussed deficiencies of the prior art, it is a primary object of the present invention to provide a software-defined radio (SDR) system comprising: 1) a reconfigurable baseband subsystem capable of supporting a plurality of wireless communication standards. According to an advantageous embodiment of the present invention, the reconfigurable baseband subsystem comprises: i) a first plurality of reconfigurable context-based operation instruction set processors. Each of the first plurality of reconfigurable context-based operation instruction set processors comprises: a) reconfigurable data path comprising a plurality of reconfigurable functional blocks; and b) a programmable finite state machine that controls the reconfigurable data path. The programmable finite state machine is capable of executing a plurality of instructions associated with a particular function.

According to one embodiment of the present invention, the software-defined radio (SDR) system further comprises: 2) a reconfigurable application subsystem capable of supporting a plurality of end-user applications. The reconfigurable application subsystem comprises: i) a second plurality of reconfigurable context-based operation instruction set processors. Each of the second plurality of reconfigurable context-based operation instruction set processors comprises: a) a reconfigurable data path comprising a plurality of reconfigurable functional blocks; and b) a programmable finite state machine that controls the reconfigurable data path. The programmable finite state machine is capable of executing a plurality of instructions associated with a particular function.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
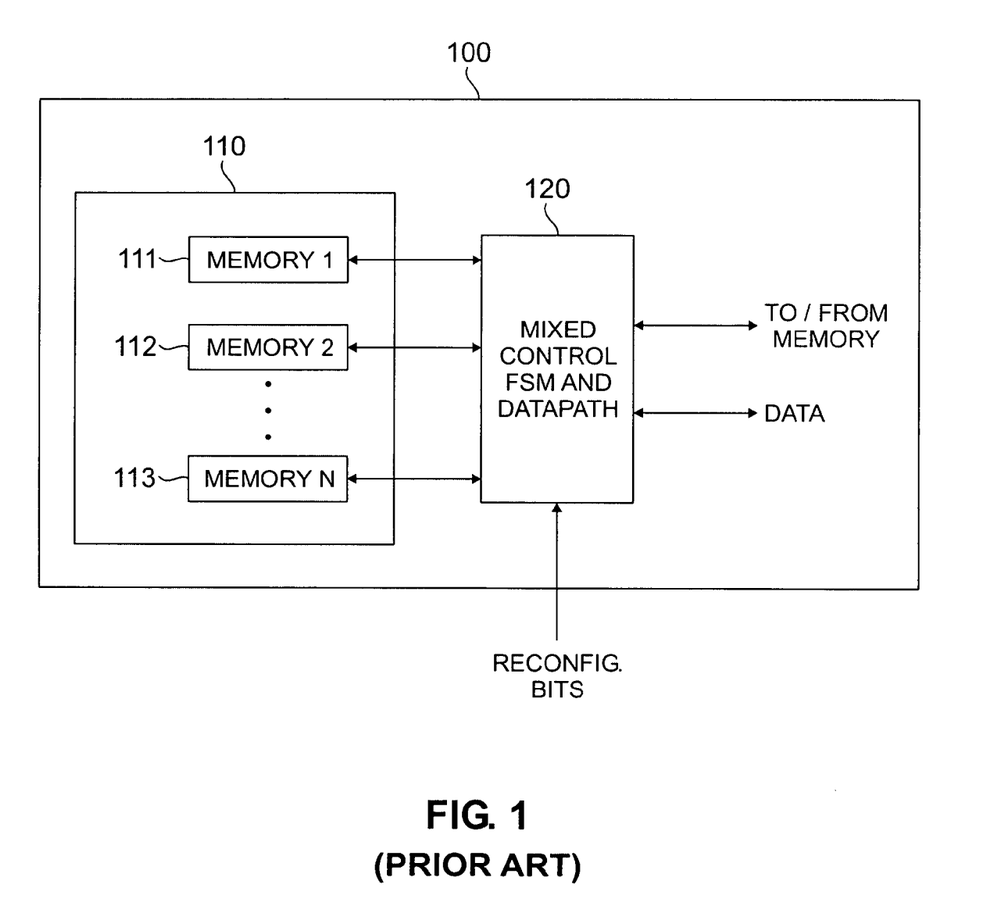
FIG. 1 is a block diagram of a conventional data processor according to an exemplary embodiment of the prior art.

FIG. 1 is a high-level block diagram of conventional data processor 100 according to an exemplary embodiment of the prior art. FIG. 1 depicts a general implementation of an application in hardware and software. Data processor 100 comprises memory 110 and control circuitry 120. Control circuitry 120 further comprises mixed control finite state machine (FSM) circuitry and datapath circuitry. Memory 110 further comprises N memory blocks, including exemplary memory blocks 111-113, which are arbitrarily labeled Memory 1, Memory 2, and Memory N.

Any data processor application may be regarded as a set of datapaths controlled and scheduled by a finite state machine (FSM), as FIG. 1 shows. A finite state machine receives input events and, in response, transitions between states and/or generates outputs. The FSM decides to which states to transition based on the current state and the received input events.

Figure 2:
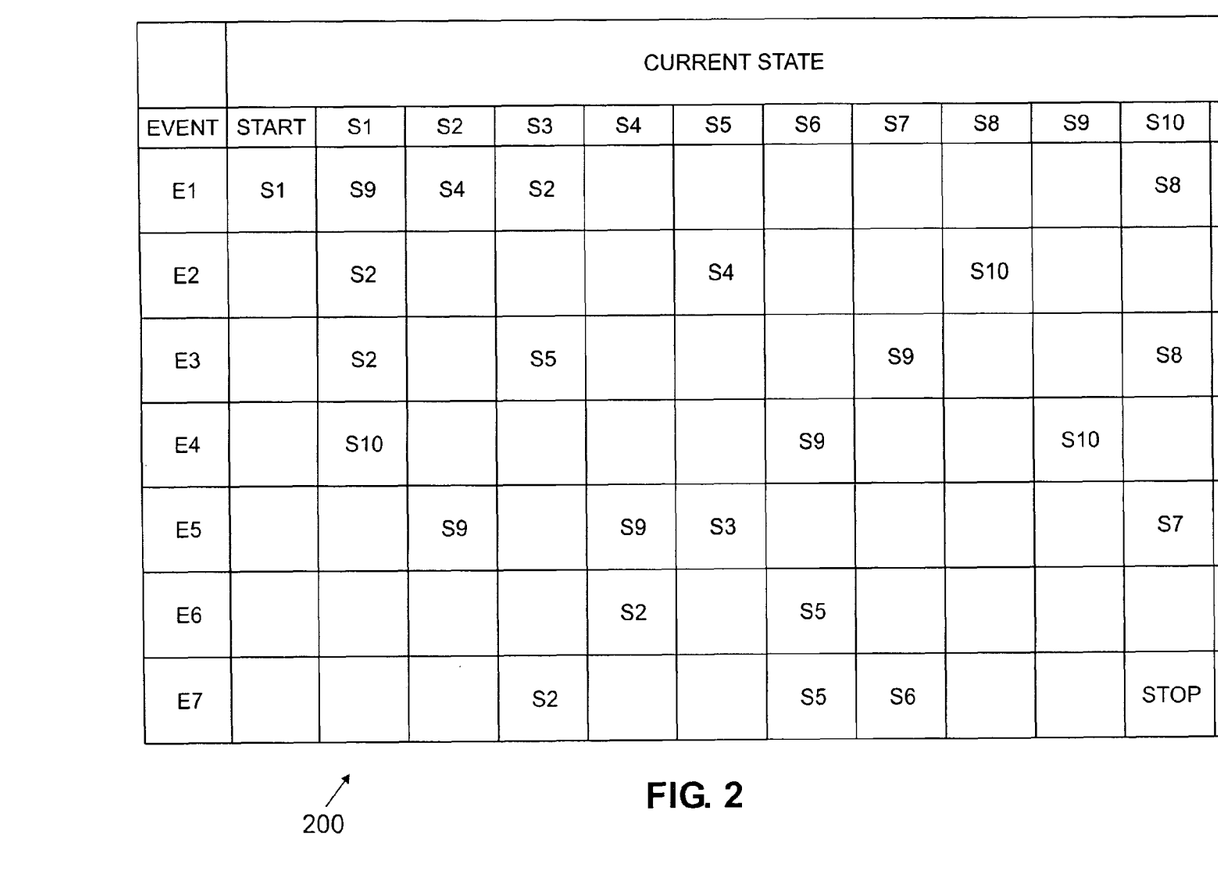
FIG. 2 illustrates a finite state machine (FSM) table for a data processor.

FIG. 2 illustrates finite state machine (FSM) table 200 for an exemplary data processor. FSM table 200 depicts the next state transitions performed by a FSM based on the current state (i.e., one of states S1-S10) and the received input event (i.e., one of events E1-E7). Initially, the FSM is in state S1. The column for state S1 indicates the state transitions for state S1 in response to events E1-E4.

In response to event E1 received during state S1, the FSM transitions from state S1 to state S9. In response to event E2 received during state S1, the FSM transitions from state S1 to state S2. In response to event E3 received during state S1, the FSM transitions from state S1 to state S2. In response to event E4 received during state S1, the FSM transitions from state S1 to state S10.

As FIG. 2 makes clear, there are many holes in the FSM table 200 for which no values are given. For example, for state S1, no values are given for events E5-E7. In prior art data processors, those holes, although they do not contribute to the flow of the finite state machine, must be provided for, otherwise the finite state machine will not work correctly. In the prior art data processors, the finite state machines cannot be further optimized to eliminate these holes.

Figure 3:
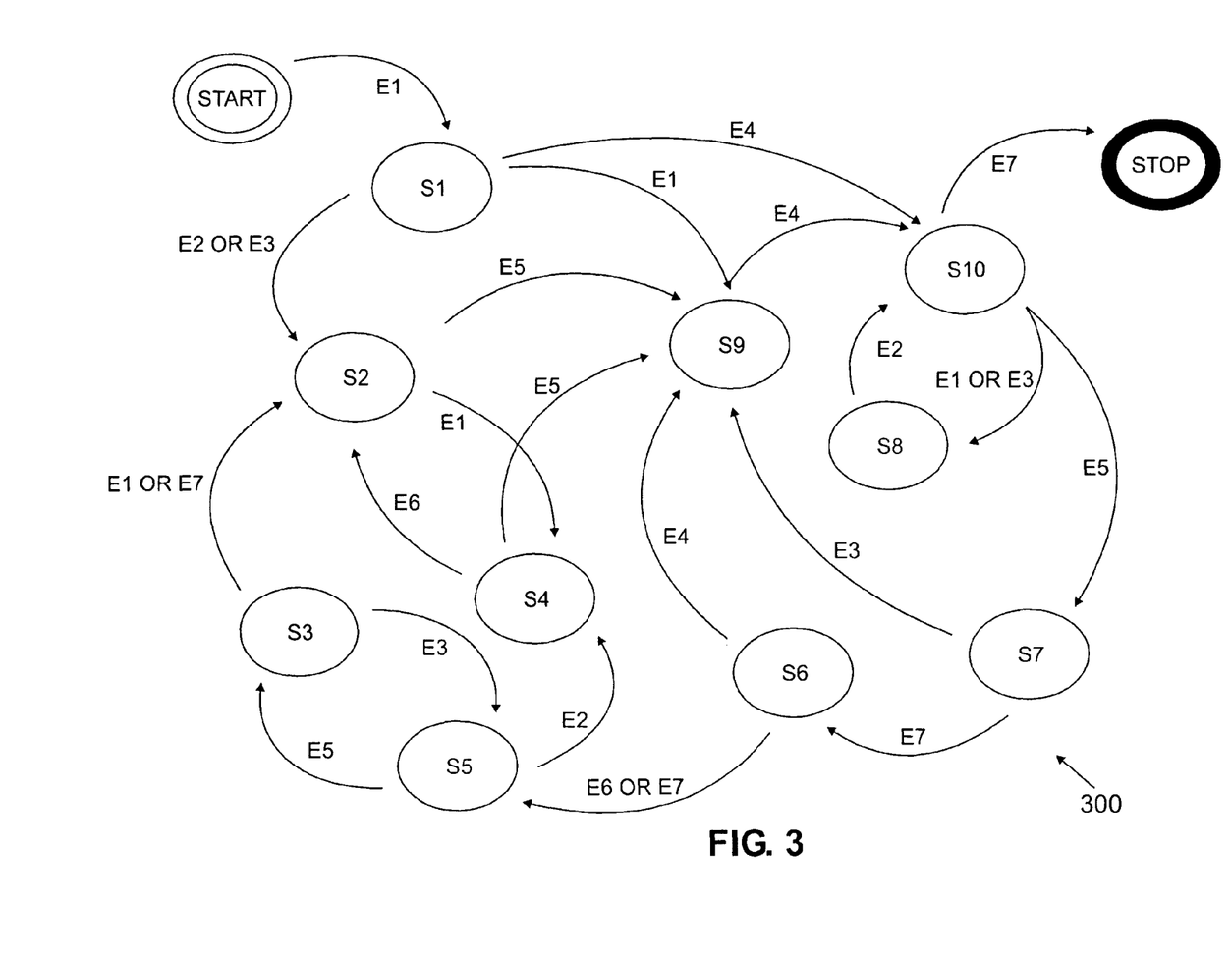
FIG. 3 is a bubble diagram corresponding to the finite state machine table in FIG. 2.

FIG. 3 illustrates bubble diagram 300, which corresponds to the finite state machine table in FIG. 2. Each of states S1-S10 is represented by a bubble and events E1-E7 cause transitions between states. These transitions are represented by the arrowed lines connecting the state bubbles. The arrowhead determines the direction of the transition.

Figure 4:
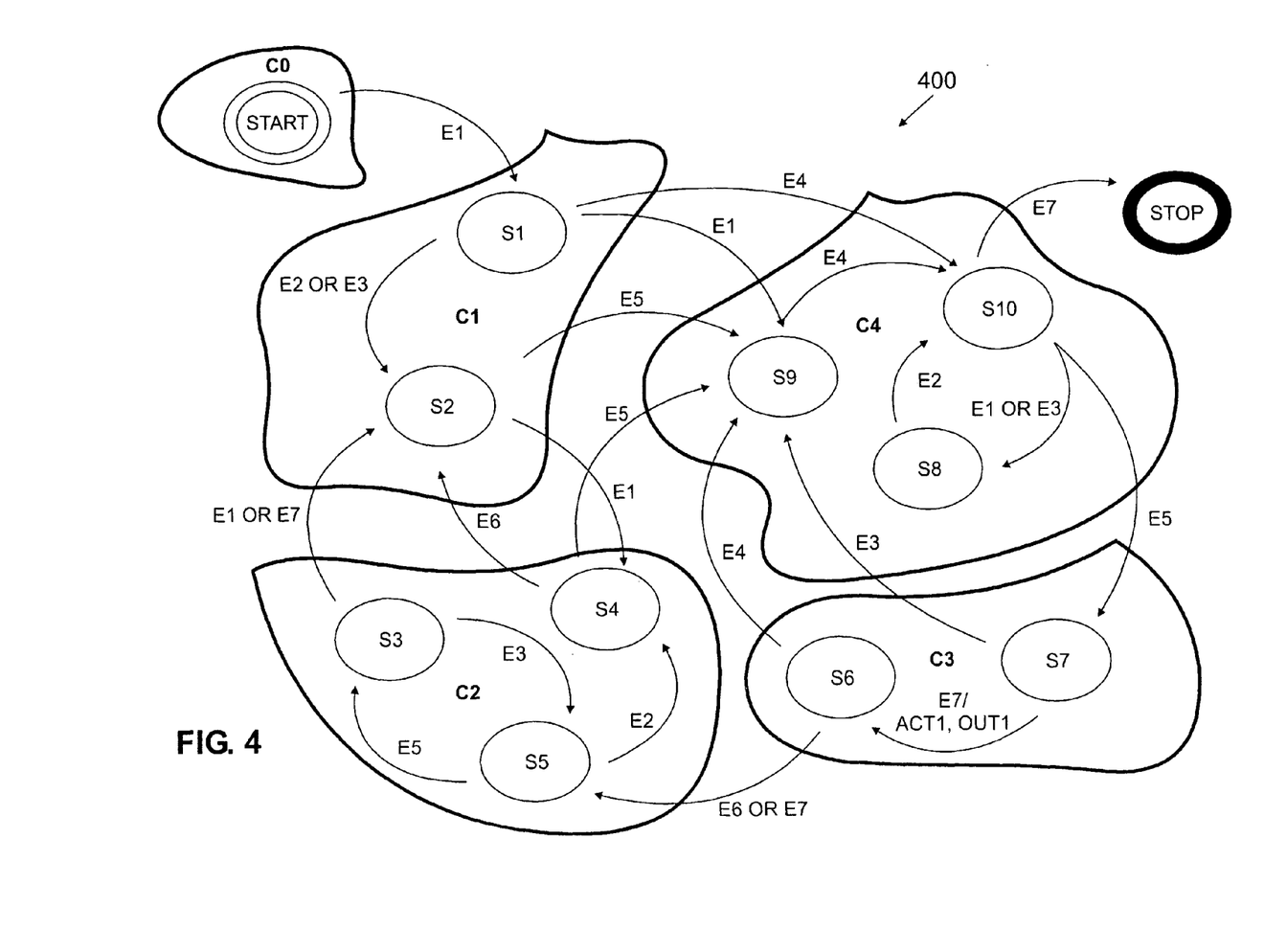
FIG. 4 is a bubble diagram showing context-based groupings of states in the finite state machine table in FIG. 2 according to an exemplary embodiment of the present invention.

It is noted that in bubble diagram 300, it is possible to group states according to contexts of execution units. For the purposes of this disclosure, a context is a group of operations and/or instructions that are related to the same function. FIG. 4 illustrates bubble diagram 400, in which states of the finite state machine table in FIG. 2 that are related to the same context are grouped together according to the principles of the present invention. The groupings of states form contexts C0, C1, C2, C3 and C4.

Each of the groupings of states in FIG. 4 may be used to create a context-based operation reconfigurable instruction set processor (CRISP) according to the principles of the present invention. Each of contexts C0-C4 comprises a minimum number of input events and a set of probable operations. Each context also has its own data path, which may comprise parallel execution units while the instruction set execution may be either in a VLIW, SIMD, microcode or other known implementation manner to increase the overall performance.

Figure 5:
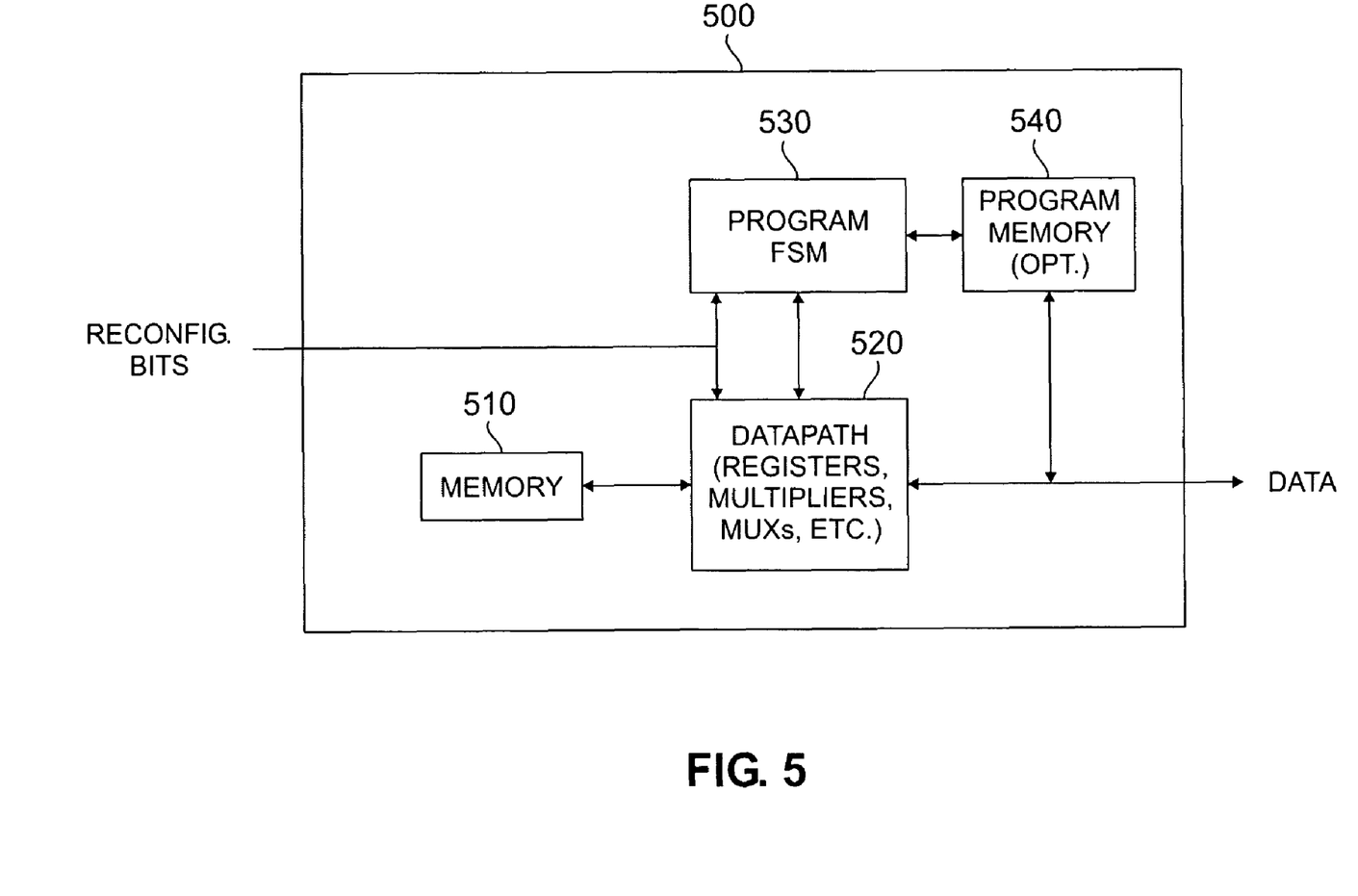
FIG. 5 is a high-level block diagram of a context-based operation reconfigurable instruction set processor according to an exemplary embodiment of the present invention.

FIG. 5 is a high-level block diagram of context-based operation reconfigurable instruction set processor (CRISP) 500, according to an exemplary embodiment of the present invention. CRISP 500 comprises memory 510, programmable data path circuitry 520, programmable finite state machine 530, and optional program memory 540. CRISP 500 is designed to implement only a subset of context-related instructions from FIG. 4 in an optimum manner. Each of the contexts C0-C4 in FIG. 4 may be implemented by a separate CRISP similar to CRISP 500. Context-based operation reconfigurable instruction set processor (CRISP) 500 defines the generic hardware block that usually consists of higher level hardware processor blocks. The principle advantage to CRISP 500 is that CRISP 500 breaks down the required application into two main domains, a control domain and a data path domain, and optimize each domain separately. By implementing a data processor application, such as a mobile station handset (e.g., cell phone, wireless laptop), using CRISP 500, the present invention at least partially overcomes the flexibility vs. power problems that adversely affect conventional data processor applications.

The control domain is implemented by programmable finite state machine 530, which may comprise a DSP, an MCU or another prior art device. Programmable FSM 530 is configured by reconfiguration bits received from an external controller (not shown). Programmable FSM 530 may execute a program stored in associated optional program memory 540. The program may be stored in program memory 540 via the DATA line from an external controller (not shown). Memory 510 is used to store application data used by data path circuitry 520.

Programmable data path circuitry 520 is divided into a set of building blocks that perform particular functions (e.g., registers, multiplexers, multipliers, and the like). Each of building blocks is both reconfigurable and programmable to allow maximum flexibility. The criteria for dividing programmable data path circuitry 520 into functional blocks depends on the level of reconfigurability and programmability required for a particular application.

Since each of the contexts C0-C4 in FIG. 4 is implemented by a separate CRISP 500 that works independently of other CRISPs, the present invention provides an efficient power management scheme that is able to shut down a CRISP when the CRISP is not required to execute. This assures that only the CRISPs that are needed at a given time are active, while other idle CRISPs do not consume any significant power.

A CRISP according to the principles of the present invention may be targeted to many applications, including, but not limited to, baseband applications in wireless devices and multimedia applications. In many applications, these contexts may be loosely-coupled independent contexts that may run concurrently with either minimum or no dependencies.

Figure 6:
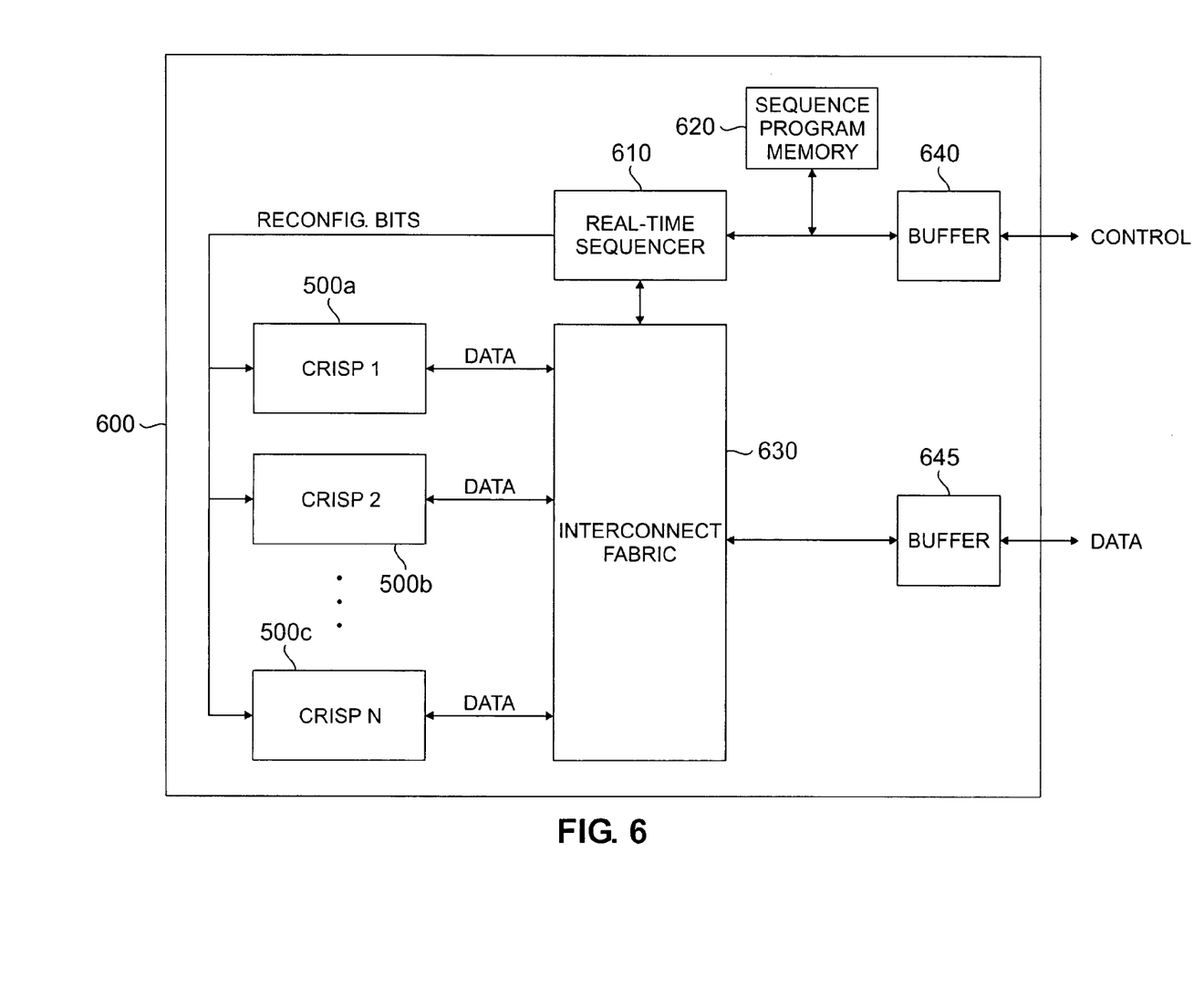
FIG. 6 is a high-level block diagram of a reconfigurable processing system comprising a plurality of context-based operation reconfigurable instruction set processors according to an exemplary embodiment of the present invention.

FIG. 6 is a high-level block diagram of reconfigurable processing system 600 according to an exemplary embodiment of the present invention. Reconfigurable processing system 600 comprises N context-based operation reconfigurable instruction set processors (CRISPs), including exemplary CRISPs 500a, 500b, and 500c, which are arbitrarily labeled CRISP 1, CRISP 2 and CRISP N. Reconfigurable processing system 600 further comprises real-time sequencer 610, sequence program memory 620, programmable interconnect fabric 630, and buffers 640 and 645.

Reconfiguration bits may be loaded into CRISPs 500a, 500b, and 500c from the CONTROL line via real-time sequencer 610 and buffer 640. A control program may also be loaded into sequence program memory 620 from the CONTROL line via buffer 640. Real-time sequencer sequences the contexts to be executed by each one of CRISPs 500a-c by retrieving program instructions from program memory 620 and sending reconfiguration bits to CRISPs 500a-c. In an exemplary embodiment, real-time sequencer 610 may comprise a stack processor, which is suitable to operate as a real-time scheduler due to its low latency and simplicity.

Reconfigurable interconnect fabric 630 provides connectively between each one of CRISPs 500a-c and an external DATA bus via bi-directional buffer 645. In an exemplary embodiment of the present invention, each one of CRISPs 500a-c may act as a master of reconfigurable interconnect fabric 630 and may initiate address access. The bus arbiter for reconfigurable interconnect fabric 630 may be internal to real-time sequencer 610.

In an exemplary embodiment, reconfigurable processing system 600 may be, for example, a cell phone or a similar wireless device, or a data processor for use in a laptop computer. In a wireless device embodiment implemented according to a software-defined radio (SDR) principles, each one of CRISPs 500a-c is responsible for executing a subset of context-related instructions that are associated with a particular reconfigurable function. For example, CRISP 500a may be configured to execute context-related instructions that process CDMA baseband signals or OFDMA baseband signals. CRISP 500b may be configured to execute context-related instructions that act as a memory controller. CRISP 500c may be configured to execute context-related instructions that perform MPEG-4 processing for multimedia applications.

A CRISP according to the principles of the present invention provides a new way of implementing reconfigurable hardware acceleration techniques. The present invention provides reconfigurability and programmability with minimum sacrifice on power efficiency. Since the CRISPs are largely independent and may be run simultaneously, the present invention has the performance advantage of parallelism without incurring the full power penalty associated with running parallel operations. The loose coupling and independence of CRISPs allows them to be configured for different systems and functions that may be shut down separately.

Figure 7:
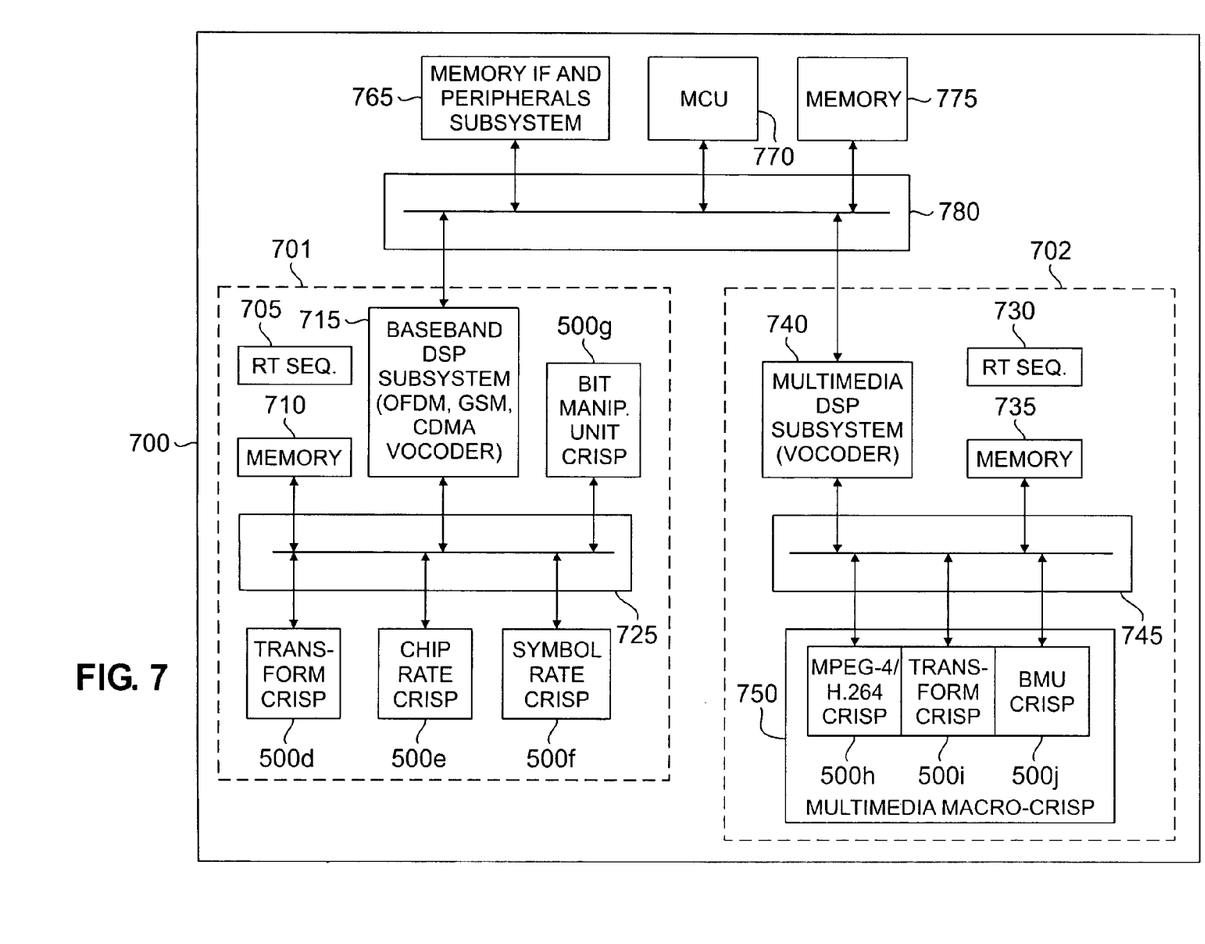
FIG. 7 is a high-level block diagram of a multi-standard software-defined radio (SDR) system comprising a plurality of context-based operation reconfigurable instruction set processors according to one embodiment of the present invention.

FIG. 7 is a high-level block diagram of multi-standard software-defined radio (SDR) system 700, which comprises a plurality of context-based operation reconfigurable instruction set processors according to one embodiment of the present invention. SDR system 700 may comprise a wireless terminal (or mobile station) that accesses a wireless network, such as, for example, a GSM or CDMA cellular telephone, a PDA with WCDMA or IEEE-802.11x capabilities, or the like.

Multi-standard SDR system 700 comprises baseband subsystem 701, applications subsystem 702, memory interface (IF) and peripherals subsystem 765, main control unit (MCU) 770, memory 775, and interconnect 780. MCU 770 may comprise, for example, a conventional microcontroller or a microprocessor (e.g., x86, ARM, RISC, DSP, etc.). Memory IF and peripherals subsystem 765 may connect SDR system 700 to an external memory (not shown) and to external peripherals (not shown). Memory 775 stores data from other components in SDR system 700 and from external devices (not shown). For example, memory 775 may store a stream of incoming data samples received from an external antenna system and an RF down-converter associated with SDR system 700. Interconnect 780 provides data transfer between subsystems 701 and 702, memory IF and peripherals subsystem 765, MCU 770, and memory 775.

Baseband subsystem 701 comprises real-time (RT) sequencer 705, memory 710, baseband DSP subsystem 715, interconnect 725, and a plurality of special purpose context-based operation instruction set processors (CRISPs), including transform CRISP 500d, chip rate CRISP 500e, symbol rate CRISP 500f, and bit manipulation unit (BMU) CRISP 500g. By way of example, transform CRISP 500d may implement a Fast Fourier Transform (FFT) function, chip rate CRISP 500e may implement a correlation function for a CDMA signal, and symbol rate CRISP 500f may implement a Viterbi decoder function.

In such an exemplary embodiment, transform CRISP 500d may receive samples of an intermediate frequency (IF) signal stored in memory 775 and perform an FFT function that generates a sequence of chip samples at a base band rate. Next, chip rate CRISP 500e receives the chip samples from transform CRISP 500d and performs a correlation function that generates a sequence of data symbols. Next, symbol rate CRISP 500f receives the symbol data from chip rate CRISP 500e and performs Viterbi decoding to recover the baseband user data. The baseband user data may then be used by applications subsystem 702.

In an exemplary embodiment of the present invention, symbol rate CRISP 500f may comprise two or more CRISPs that operate in parallel. Also, by way of example, BMU CRISP 500g may implement such functions as variable length coding, cyclic redundancy check (CRC), convolutional encoding, and the like. Interconnect 725 provides data transfer between RT sequencer 705, memory 710, baseband DSP subsystem 715 and CRISPs 500d-500g.

Applications subsystem 702 comprises real-time (RT) sequencer 730, memory 735, multimedia DSP subsystem 740, interconnect 745, and multimedia macro-CRISP 750. Multimedia macro-CRISP 750 comprises a plurality of special purpose context-based operation instruction set processors, including MPEG-4/H.264 CRISP 500h, transform CRISP 550i, and BMU CRISP 500j. In an exemplary embodiment of the present invention, MPEG-4/H.264 CRISP 550h performs motion estimation functions and transform CRISP 500h performs a discrete cosine transform (DCT) function. Interconnect 780 provides data transfer between RT sequencer 730, memory 735, multimedia DSP subsystem 740, and multimedia macro-CRISP 750.

In the exemplary embodiment shown in FIG. 7, the use of CRISP devices enables applications subsystem 702 of multi-standard SDR system 700 to be reconfigured to support multiple video standards with multiple profiles and sizes. Additionally, the use of CRISP devices enables baseband subsystem 701 of multi-standard SDR system 700 to be reconfigured to support multiple air interface standards. Thus, SDR system 700 is able to operate in different types of wireless networks (e.g., CDMA, GSM, 802.11x, etc.) and can play different types of video and audio formats. However, the use of CRISPS according to the principles of the present invention enables SDR system 700 to perform these functions with much lower power consumption than conventional wireless devices having comparable capabilities.

Although the present invention has been described with an exemplary embodiment, various changes and modifications may be suggested to one skilled in the art. It is intended that the present invention encompass such changes and modifications as fall within the scope of the appended claims.

What is claimed is:

1. A software-defined radio (SDR) system configured by reconfiguration bits received from an external controller comprising:
 a reconfigurable baseband subsystem supporting a plurality of wireless communication standards comprising a first plurality of context-based operation reconfigurable instruction set processors CRISPs, each of said first plurality of CRISPs comprising a reconfigurable data path comprising a plurality of reconfigurable functional blocks, and a programmable finite state machine that controls said reconfigurable data path, wherein said programmable finite state machine is executing a plurality of instructions associated with a particular function; and
 a reconfigurable application subsystem supporting a plurality of end-user applications comprising a second plurality of CRISPs, each of said second plurality of CRISPs comprising a second reconfigurable data path comprising a plurality of second reconfigurable functional blocks, and a second programmable finite state machine that controls said second reconfigurable data path, wherein said second programmable finite state machine executing a second plurality of instructions associated with a second particular function.

2. The software-defined radio (SDR) system as set forth in claim 1, wherein a first one of said first plurality of CRISPs comprises a transform CRISP receiving intermediate frequency signal samples and generating therefrom a first baseband signal.

3. The software-defined radio (SDR) system as set forth in claim 2, wherein said transform CRISP performs a Fast Fourier transform function.

4. The software-defined radio (SDR) system as set forth in claim 2, wherein a second one of said first plurality of CRISPs comprises a chip rate CRISP receiving said first baseband signal and generating therefrom a plurality of data symbols.

5. The software-defined radio (SDR) system as set forth in claim 4, wherein said chip rate CRISP performs a correlation function.

6. The software-defined radio (SDR) system as set forth in claim 5, wherein said chip rate CRISP generates said plurality of data symbols from a sequence of chip samples associated with a code-division multiples access (CDMA)

7. The software-defined radio (SDR) system as set forth in claim 4, wherein a third one of said first plurality of CRISPs comprises a symbol rate CRISP receiving said plurality of data symbols and generating therefrom an output baseband signal suitable for use an application program associated with said SDR system.

8. The software-defined radio (SDR) system as set forth in claim 7, wherein said symbol rate CRISP performs a decoding function.

9. The software-defined radio (SDR) system as set forth in claim 8, wherein said symbol rate CRISP performs a Viterbi decoding of said plurality of data symbols.

10. The software-defined radio (SDR) system as set forth in claim 2, wherein said reconfigurable data path and said programmable finite state machine in said each CRISP are configured by reconfiguration bits received from an external controller in said software-defined radio system.

11. The software-defined radio (SDR) system as set forth in claim 1, wherein said each CRISP further comprises a program memory coupled to said programmable finite state machine, wherein said program memory is storing said plurality of instructions for retrieval and execution by said programmable finite state machine.

12. The software-defined radio (SDR) system as set forth in claim 11, wherein said plurality of instructions are stored in said program memory by said external controller.

13. The software-defined radio (SDR) system as set forth in claim 12, wherein said each CRISP may be disabled by said external controller when another one of said plurality of CRISPs is operating.

14. The software-defined radio (SDR) system as set forth in claim 1, wherein a first one of said second plurality of CRISPs comprises a motion estimation CRISP receiving an output baseband signal from said reconfigurable baseband subsystem and generating therefrom a first video signal.

15. The software-defined radio (SDR) system as set forth in claim 14, wherein said motion estimation CRISP performs motion estimation according to the MPEG-4 standard.

16. The software-defined radio (SDR) system as set forth in claim 14, wherein a second one of said second plurality of CRISPs comprises a transform CRISP receiving said video signal from said motion estimation CRISP and generating therefrom a second video signal.

17. The software-defined radio (SDR) system as set forth in claim 16, wherein said transform CRISP performs a discrete cosine transform (DCT) function.

18. The software-defined radio (SDR) system as set forth in claim 1, wherein said reconfigurable data path, said second reconfigurable data path, said programmable finite state machine, and said second programmable finite state machine of said each CRISP in each of said reconfigurable baseband subsystem and said reconfigurable application subsystem are configured by reconfiguration bits received from an external controller in said software-defined radio system.

19. The software-defined radio (SDR) system as set forth in claim 18, wherein said each CRISP further comprises a program memory coupled to said programmable finite state machine, wherein said program memory is storing said plurality of instructions for retrieval and execution by said programmable finite state machine.

\* \* \* \* \*